United States Patent
Tsai et al.

(10) Patent No.: US 10,855,416 B2
(45) Date of Patent: Dec. 1, 2020

(54) SEGMENTATION OF CONTROL PAYLOAD FOR CHANNEL ENCODING

(71) Applicant: Mediatek Inc., Hsin-Chu (TW)

(72) Inventors: Lung-Sheng Tsai, Hsinchu (TW); Xiu-Sheng Li, Hsinchu (TW); Weidong Yang, San Jose, CA (US); Wei-De Wu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/190,301

(22) Filed: Nov. 14, 2018

(65) Prior Publication Data
US 2019/0149285 A1 May 16, 2019

Related U.S. Application Data

(60) Provisional application No. 62/586,982, filed on Nov. 16, 2017.

(51) Int. Cl.
*H04L 5/00* (2006.01)
*H04W 72/10* (2009.01)
*H04W 72/04* (2009.01)

(52) U.S. Cl.
CPC .......... *H04L 5/0044* (2013.01); *H04L 5/0053* (2013.01); *H04L 5/0057* (2013.01);
(Continued)

(58) Field of Classification Search
CPC ..... H04L 1/1854; H04L 27/2675; H04L 5/00; H04L 27/22; H04W 28/04; H04W 72/04; H04B 1/10
See application file for complete search history.

(56) References Cited

U.S. PATENT DOCUMENTS

| | | |
|---|---|---|
| 2012/0230211 A1 | 9/2012 | Sandberg et al. |
| 2018/0006791 A1* | 1/2018 | Marinier ............... H04L 1/0026 |

(Continued)

FOREIGN PATENT DOCUMENTS

| | | |
|---|---|---|
| CN | 101370240 A | 2/2009 |
| CN | 103314560 A | 9/2013 |

(Continued)

OTHER PUBLICATIONS

International Search Report of PCT/CN2018/115914, dated Feb. 19, 2019.
(Continued)

*Primary Examiner* — Iqbal Zaidi
(74) *Attorney, Agent, or Firm* — Locke Lord LLP; Tim Tingkang Xia, Esq.

(57) ABSTRACT

A method of wireless communication of a UE is provided. The UE determines K1 information bits carrying one or more CSI reports, the one or more reports including a first CSI report, K1 being an integer greater than 0. The UE selects K2 information bits from the K1 information bits, the K2 information bits excluding a part of information bits of the first CSI report, K2 being an integer greater than 0 and smaller than K1. The UE determines that the K2 information bits are in a first predetermined relationship with a threshold. The UE transmits E2 encoded bits derived from the K2 information bits in a physical up-link channel to a base station, E2 being an integer greater than 0.

17 Claims, 17 Drawing Sheets

(52) U.S. Cl.
CPC ....... *H04W 72/0413* (2013.01); *H04W 72/10* (2013.01); *H04L 5/0091* (2013.01)

(56) References Cited

U.S. PATENT DOCUMENTS

2019/0181975 A1\* 6/2019 Kalhan ................. H04L 5/0035
2019/0268921 A1\* 8/2019 Jiang .................... H04W 80/08

FOREIGN PATENT DOCUMENTS

| CN | 107005391 A | 8/2017 |
| WO | 2018049349 A1 | 3/2018 |
| WO | 2018090816 A1 | 5/2018 |

OTHER PUBLICATIONS

Taiwan Patent Office, "Office Action", dated May 29, 2020, Taiwan.

\* cited by examiner

SEGMENTATION OF CONTROL PAYLOAD FOR CHANNEL ENCODING

CROSS-REFERENCE TO RELATED APPLICATION(S)

This application claims the benefits of U.S. Provisional Application Ser. No. 62/586,982, entitled "SEGMENTATION OF CONTROL PAYLOAD FOR CHANNEL ENCODING" and filed on Nov. 16, 2017, which is expressly incorporated by reference herein in their entirety.

BACKGROUND

Field

The present disclosure relates generally to communication systems, and more particularly, to techniques of reducing uplink control information (UCI) payload at a user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE determines K1 information bits carrying one or more CSI reports, the one or more reports including a first CSI report, K1 being an integer greater than 0. The UE selects K2 information bits from the K1 information bits, the K2 information bits excluding a part of information bits of the first CSI report, K2 being an integer greater than 0 and smaller than K1. The UE determines that the K2 information bits are in a first predetermined relationship with a threshold. The UE transmits E2 encoded bits derived from the K2 information bits in a physical up-link channel to a base station, E2 being an integer greater than 0.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
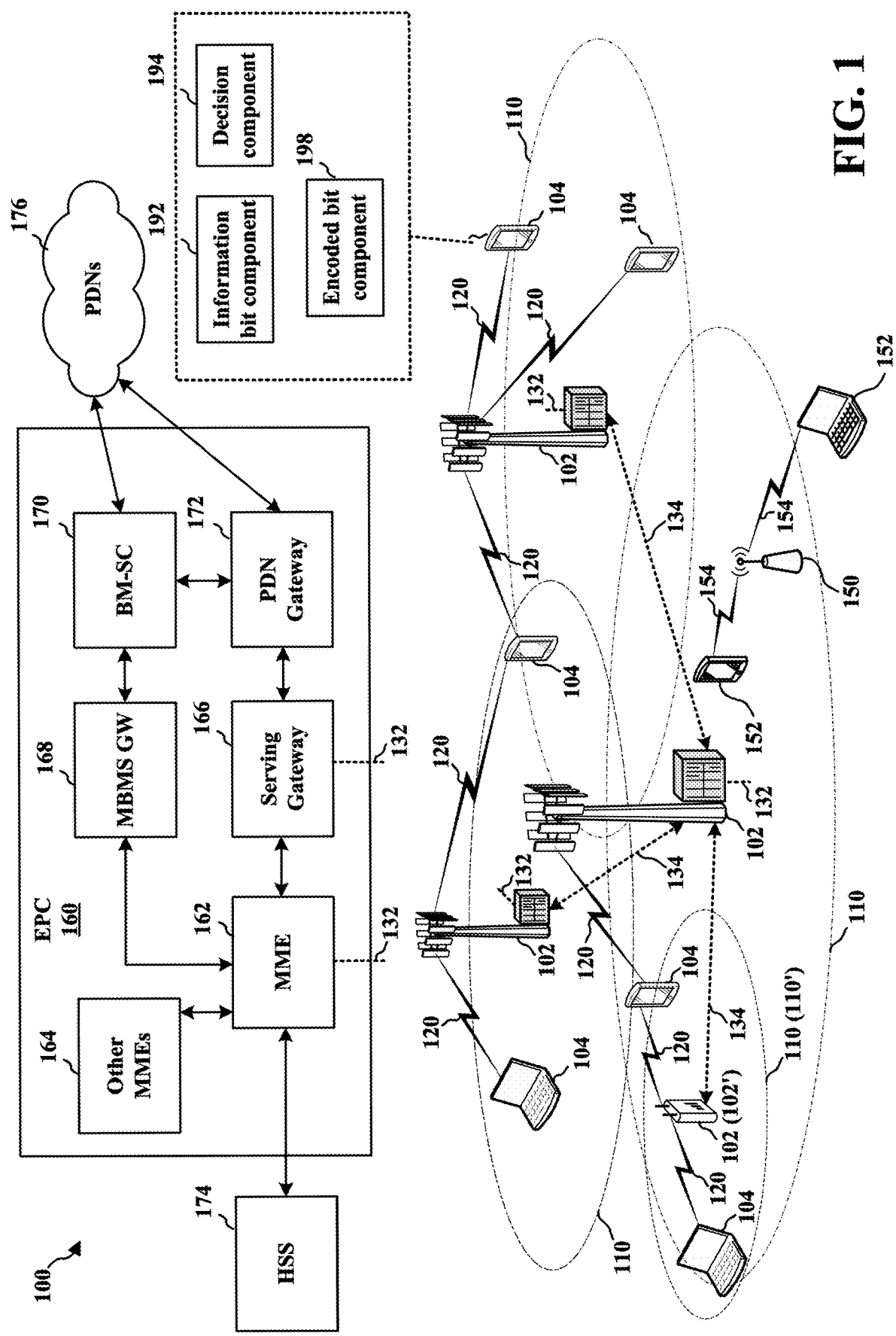
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 1 10. For example, the small cell 102' may have a coverage area 110' that overlaps the coverage area 1 10 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 includes, among other components, an information bit component 192, a decision component 194, and an encoded bit component 198. The decision component 194 determines K1 information bits carrying one or more CSI reports, the one or more reports including a first CSI report, K1 being an integer greater than 0. The information bit component 192 selects K2 information bits from the K1 information bits, the K2 information bits excluding a part of information bits of the first CSI report, K2 being an integer greater than 0 and smaller than K1. The decision component 194 determines that the K2 information bits are in a first predetermined relationship with a threshold. The UE transmits E2 encoded bits derived from the K2 information bits in a physical up-link channel to a base station, E2 being an integer greater than 0.

Figure 2:
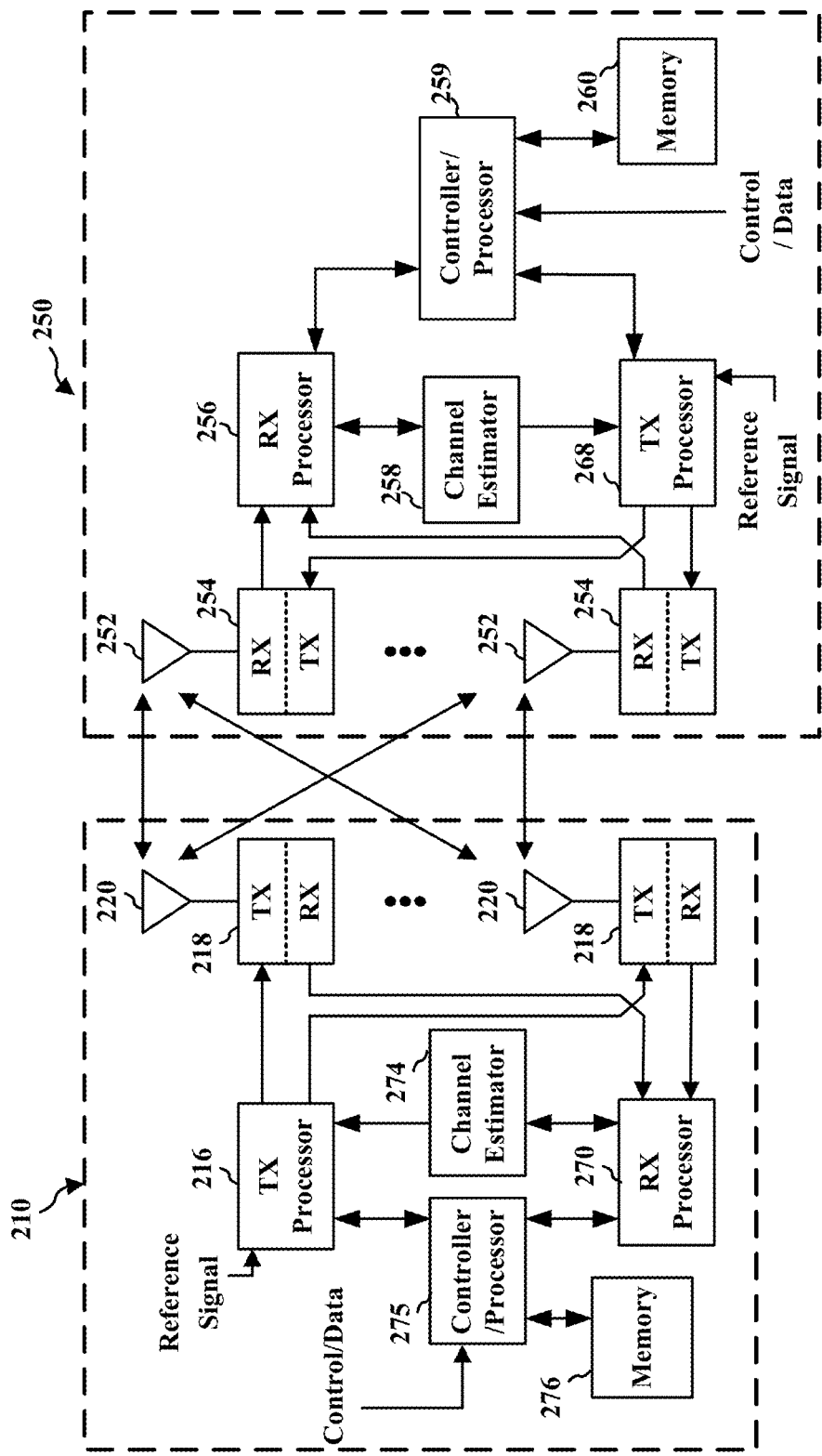
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
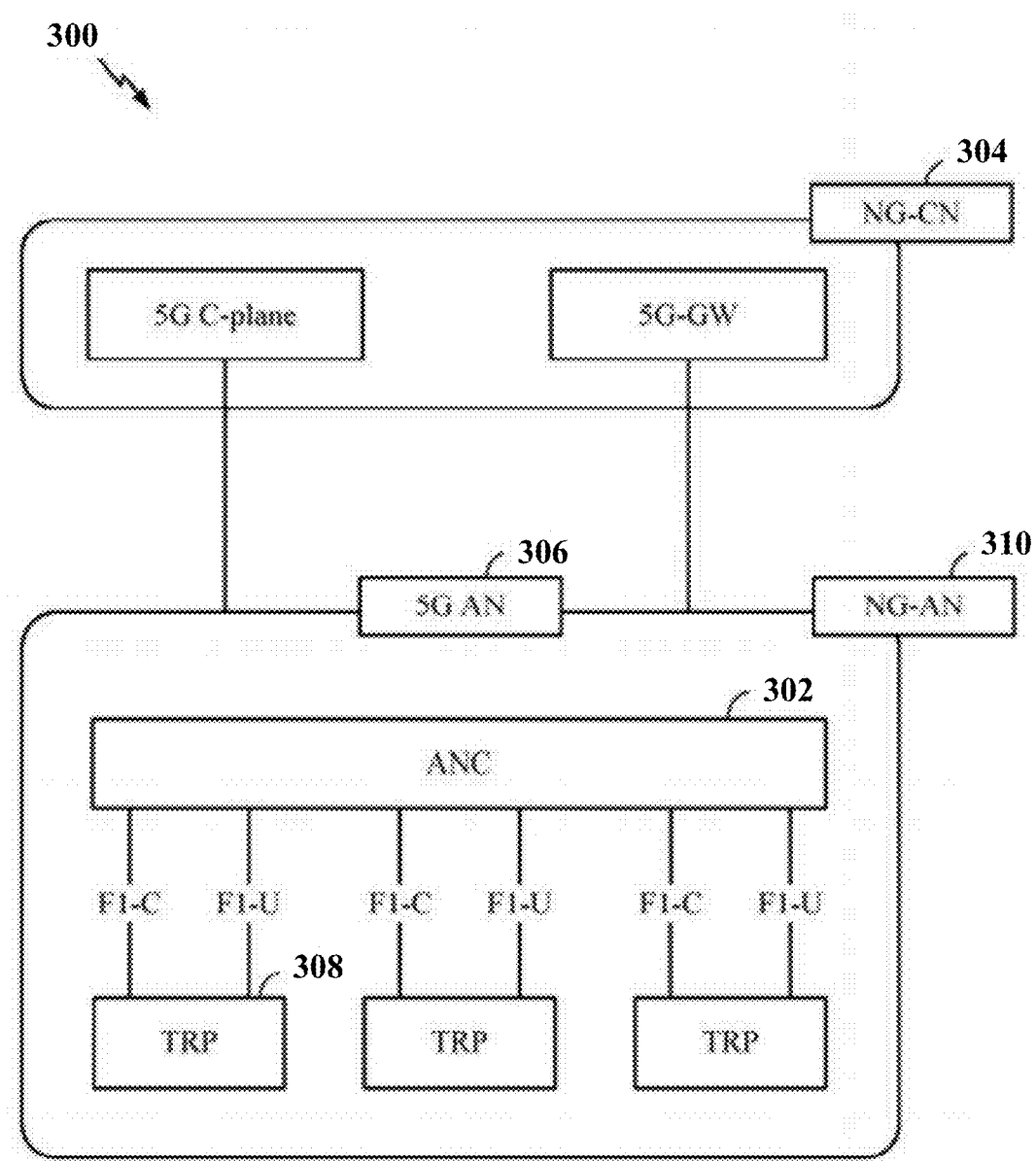
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
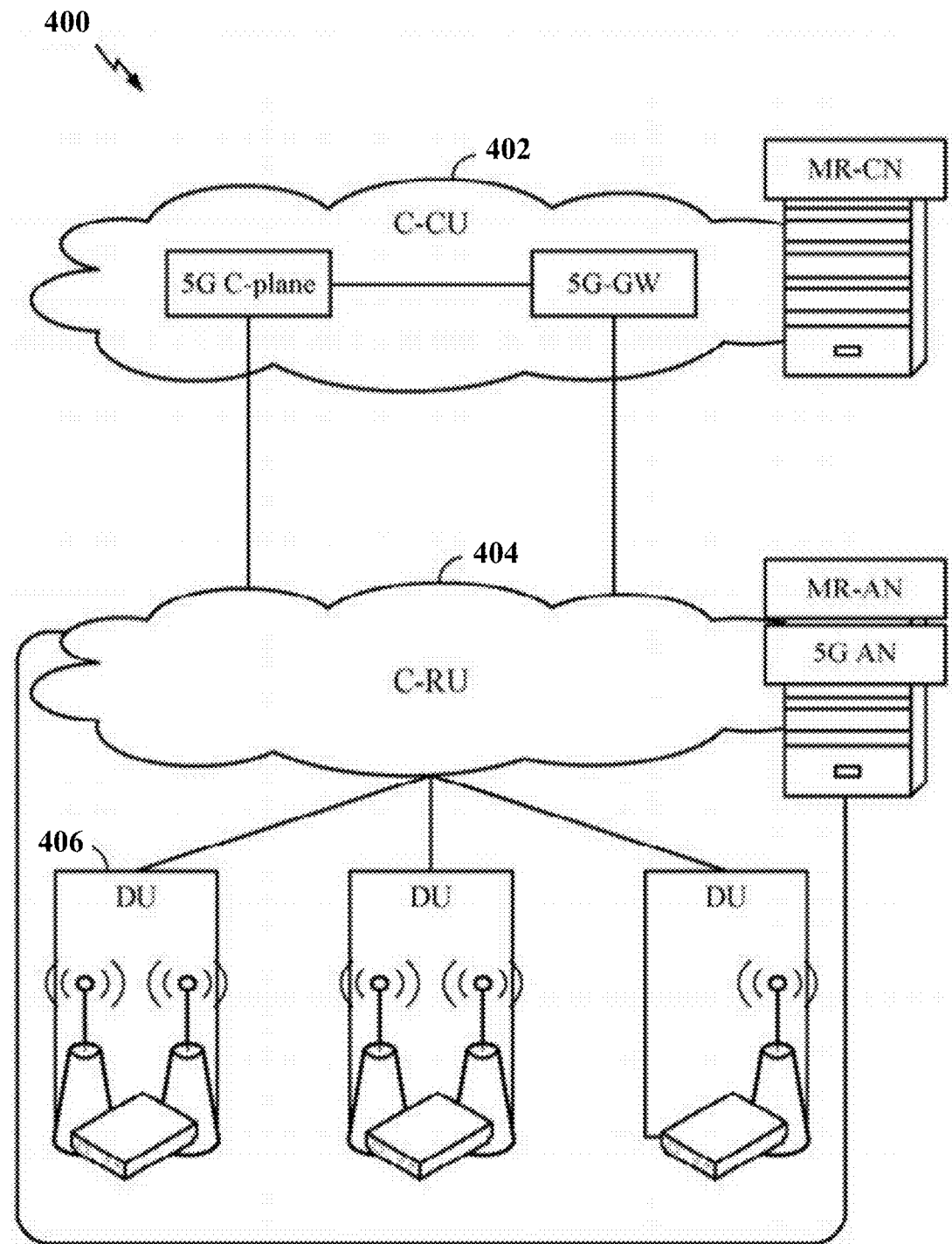
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
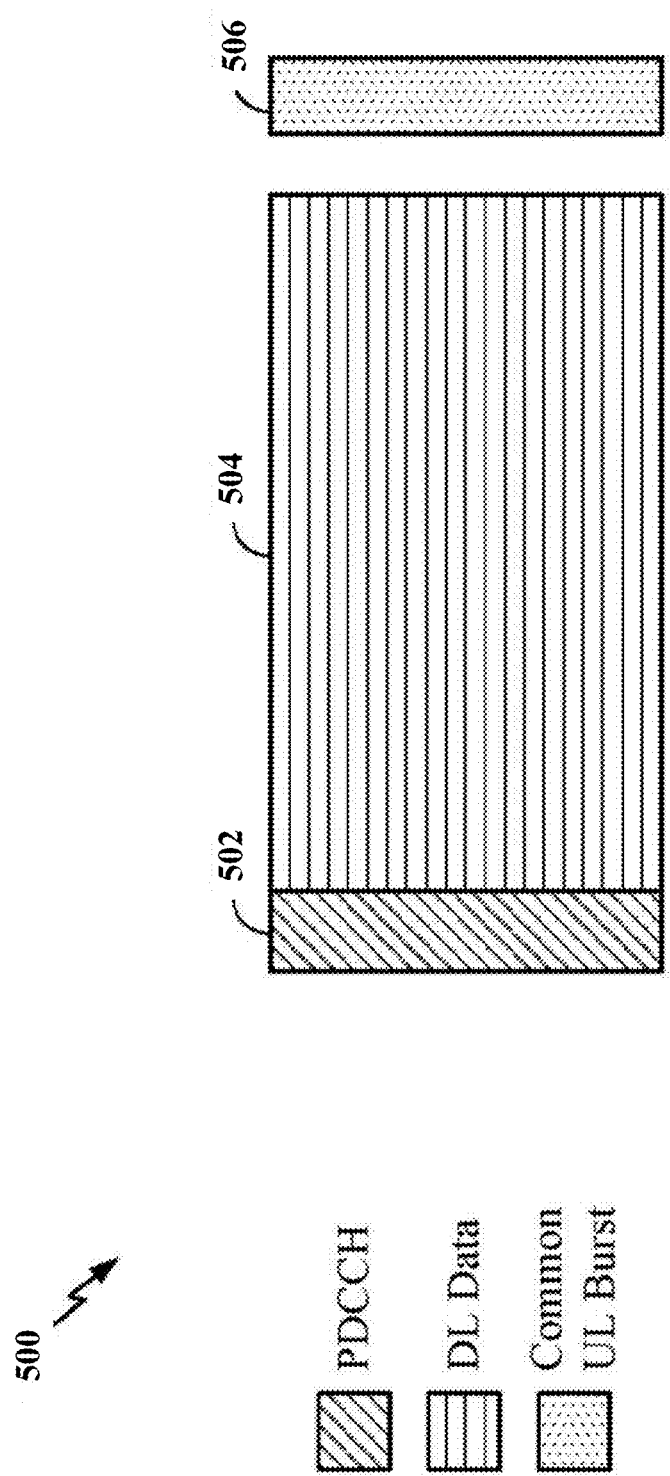
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
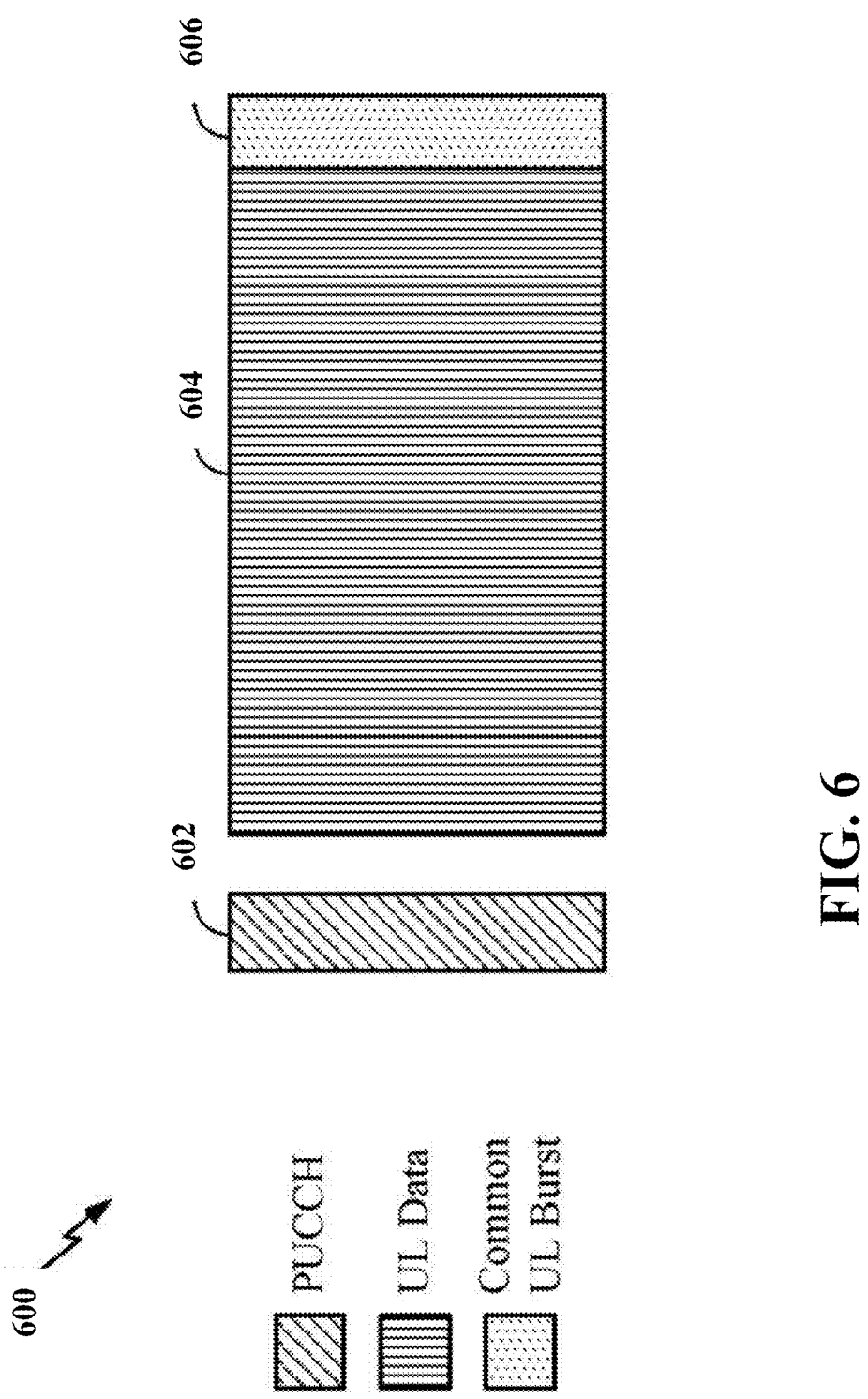
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Channel state information (CSI) reports provide the network with information about the current channel conditions. CSI usually comprises one or more pieces of information: rank indicator (RI), precoder matrix indicator (PMI), channel-quality indicator (CQI), and channel state information reference signal (CSI-RS) resource indicator (CRI).

Figure 7:
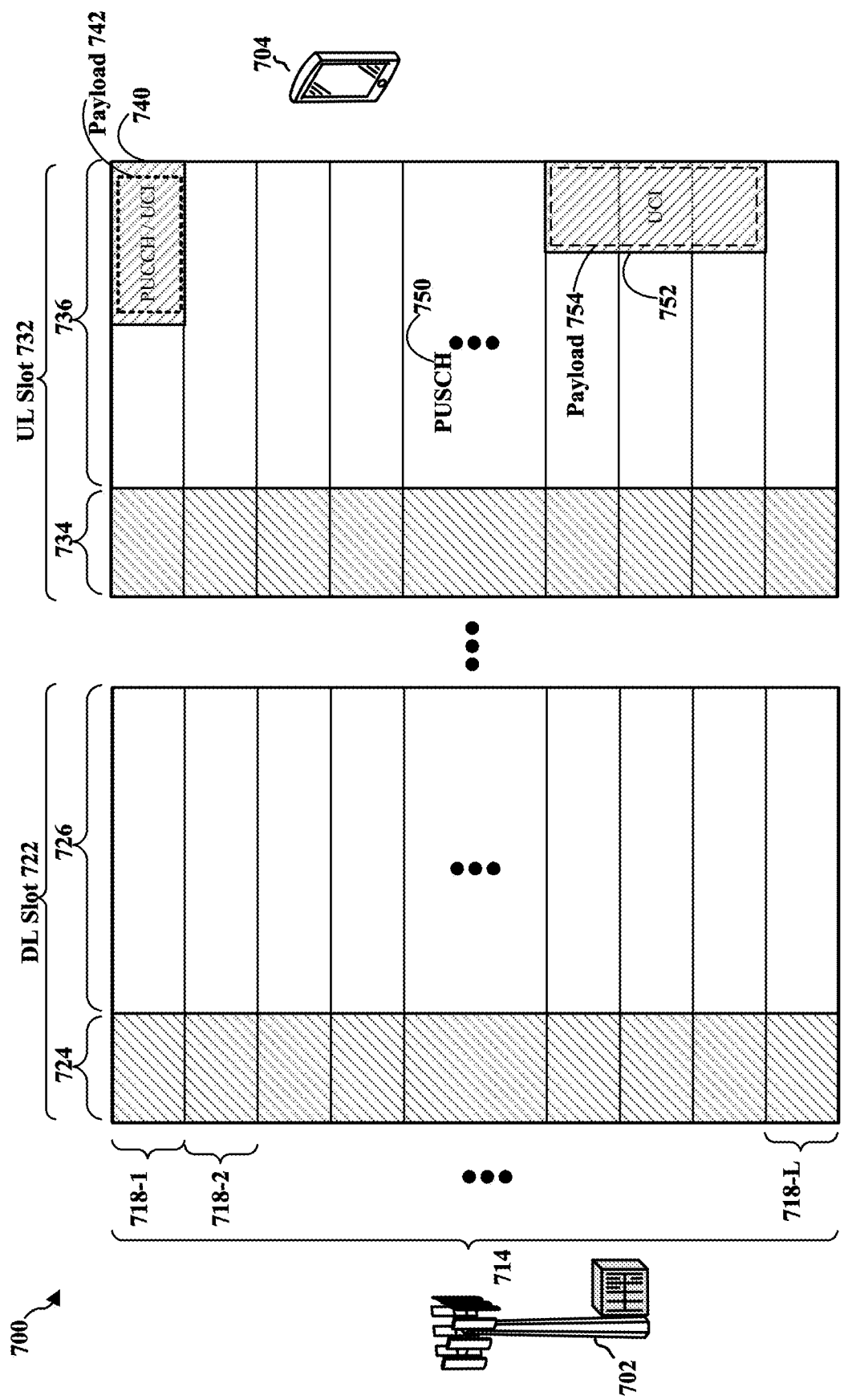
FIG. 7 is a diagram illustrating communications between a UE and a base station.

FIG. 7 is a diagram 700 illustrating communications between a UE 704 and a base station 702. In this example, the base station 702 communicates with the UE 704 on a carrier 710. In particular, the UE 704 operates on a wideband 714 having L subbands 718-1 to 718-L on the carrier 710. The base station 702 and the UE 704 communicate in, among other slots, a downlink slot 722 and an uplink slot 732. Further, in this example, the downlink slot 722 has a control region 724 and a data region 726, and the uplink slot 732 has a control region 734 and a data region 736. The data region 736 of the uplink slot 732 includes a Physical Uplink Control Channel (PUCCH) 740 and a Physical Uplink Shared Channel (PUSCH) 750 allocated for the UE 704.

The UE 704 needs to send unlink control information (UCI) to the base station 702. The UE 704 may send the UCI in the PUCCH 740 or in a UCI section 752 of the PUSCH 750. The PUCCH 740 provides an available payload 742 for carrying UCI. The UCI section 752 provides an available payload 754 for carrying UCI. The UE 704 can select resources of the PUCCH 740 or the UCI section 752 to carry UCI.

Figure 8:
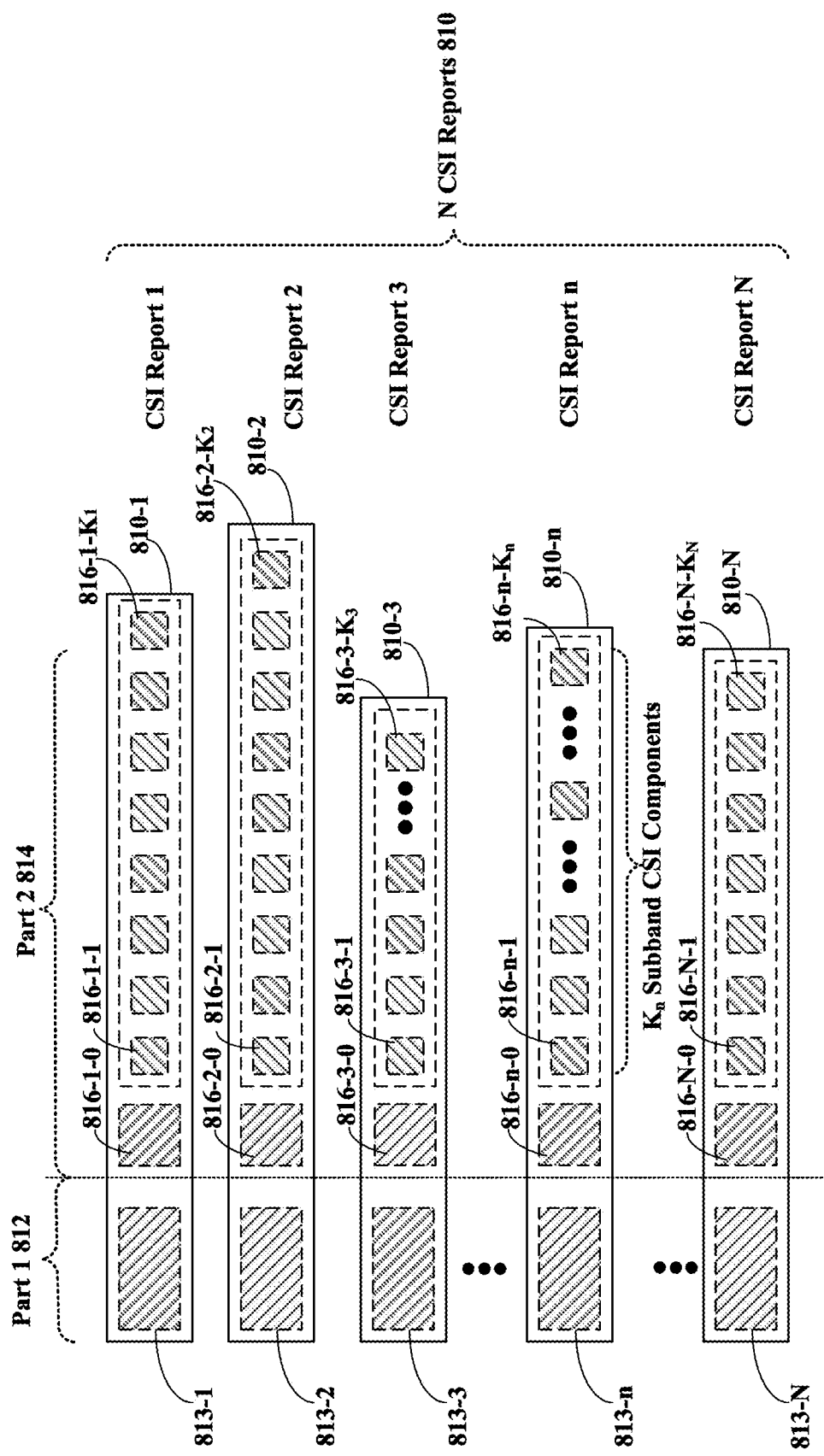
FIG. 8 is a diagram illustrating CSI reports to be sent from the UE to the base station.

FIG. 8 is a diagram 800 illustrating CSI reports to be sent from the UE 704 to the base station 702. In this example, there are N CSI reports 810-1 to 810-N to be carried over the UCI section 752. N is an integer greater than 0. FIG. 8 shows a CSI report n 810-$n$ (where n is 1, 2, 3, . . . , or N) that can represent any one of the N CSI reports 810-1 to 810-N. Each of the N CSI reports has a Part 1 812 that contains CSI of the wideband 714 and a Part 2 814 that contains CSI of both the wideband 714 and one or more subbands of the L subbands 718-1 to 718-L. For a given CSI report n 810-$n$, Part 1 812 of the CSI report n 810-$n$ includes a sub-report 813-$n$ containing CSI of the wideband 714. Part 2 814 of the CSI report n 810-$n$ includes a sub-report 816-$n$-0 (i.e., Part 2 wideband CSI) and $K_n$ sub-reports 816-$n$-1 to 816-$n$-$K_n$ (i.e., Part 2 subband CSIs) containing CSI for $K_n$ subbands of the L subbands 718-1 to 718-L, respectively. $K_n$ is an integer greater than 0 and not greater than L.

Figure 9:
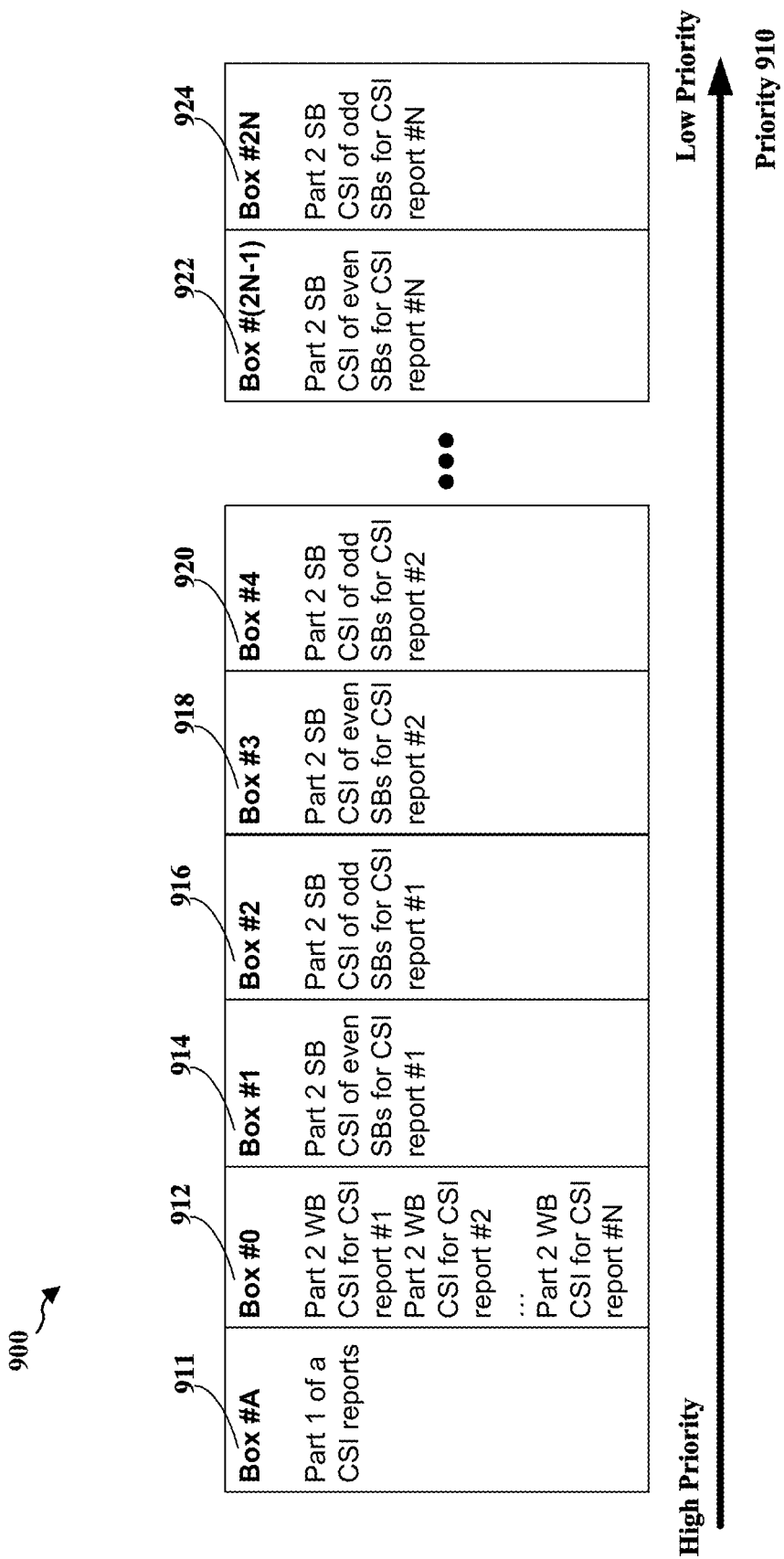
FIG. 9 is a diagram illustrating how to apply an omission rule based on priorities in CSI reporting.

FIG. 9 is a diagram 900 illustrating how to apply an omission rule based on priorities in CSI reporting. Generally, if a payload (e.g., the payload 742 or the payload 754 in FIG. 7) to carry CSI reports is large enough, all components of the CSI reports can be carried in the payload. However, when a payload to carry CSI reports is not large enough, a UE (e.g., the UE 704) need to decide which components of the CSI reports will be carried and which components of the CSI reports have to be omitted. There may be different ways for a UE to make such a decision, and one option is to make such a decision based on a predetermined priority rule. More specifically, a UE will omit CSI components with relatively low priorities. In other words, a UE will always carry CSI components with the highest priority in a payload first, and if the UE can still carry more CSI components in the payload, the UE will carry CSI components with the next highest priority in the payload. This process continues until when the remaining payload size is not large enough to carry all CSI components with the next highest priority. An example of such an omission rule based on priorities in CSI reporting is illustrated in FIG. 9.

In FIG. 9, different CSI components of N CSI reports (e.g., the N CSI reports 810-1 to 810-N) are classified into different boxes (i.e., Box # A 911 to Box #2N 924) with different priorities 910. Box # A 911 has Part 1 of all of the N CSI reports 810-1 to 810-N (e.g., Part 1 813-1 to 813-N). Box #0 912 has Part 2 wideband CSI for each of the N CSI reports 810-1 to 810-N (e.g., Part 2 wideband CSI reports 816-1-0 to 816-N-0). Box #1 914 has Part 2 subband CSI of even subbands for CSI report 1 810-1. Box #2 916 has Part 2 subband CSI of odd subbands for CSI report 1 810-1. Box #3 918 has Part 2 subband CSI of even subbands for CSI report 2 810-2. Box #4 920 has Part 2 subband CSI of odd subbands for CSI report 2 810-2. Similarly, Box #(2N−1) 922 has Part 2 subband CSI of even subbands for CSI report N 810-N. Box #2N 924 has Part 2 subband CSI of odd subbands for CSI report N 810-N. Among these boxes, the priority 910 level goes from high to low from Box # A 911 to Box #2N 924.

Under the omission rule illustrated in FIG. 9, when Part 2 information bits of partial subbands need to be omitted, CSI components with the lowest priority (e.g., in Box #2N 924) are omitted first. If more CSI components still need to be omitted, remaining CSI components with the lowest priority (e.g., in Box #(2N−1) 922) are then omitted. This process continues until the UE 704 can carry all the remaining CSI components (e.g., in Box # A 911 to Box #4 920) in the payload (e.g., the payload 742 or the payload 754 in FIG. 7).

In some scenarios, the total payload size may be too large or greater than a predefined value and, therefore, not suitable to be encoded directly. These scenarios could happen if CSI feedback contains of multiple CSI reports (e.g., N CSI reports 810-1 to 810-N) aggregated together. For example, this could happen in a network employs multiple Tx/Rx Points (multi-TRPs) and/or Multiple User Multiple Input Multiple Output (MU-MIMO) techniques, where multiple CSI reports are requested. This could also happen when the network utilizes multiple component carriers.

Figure 10:
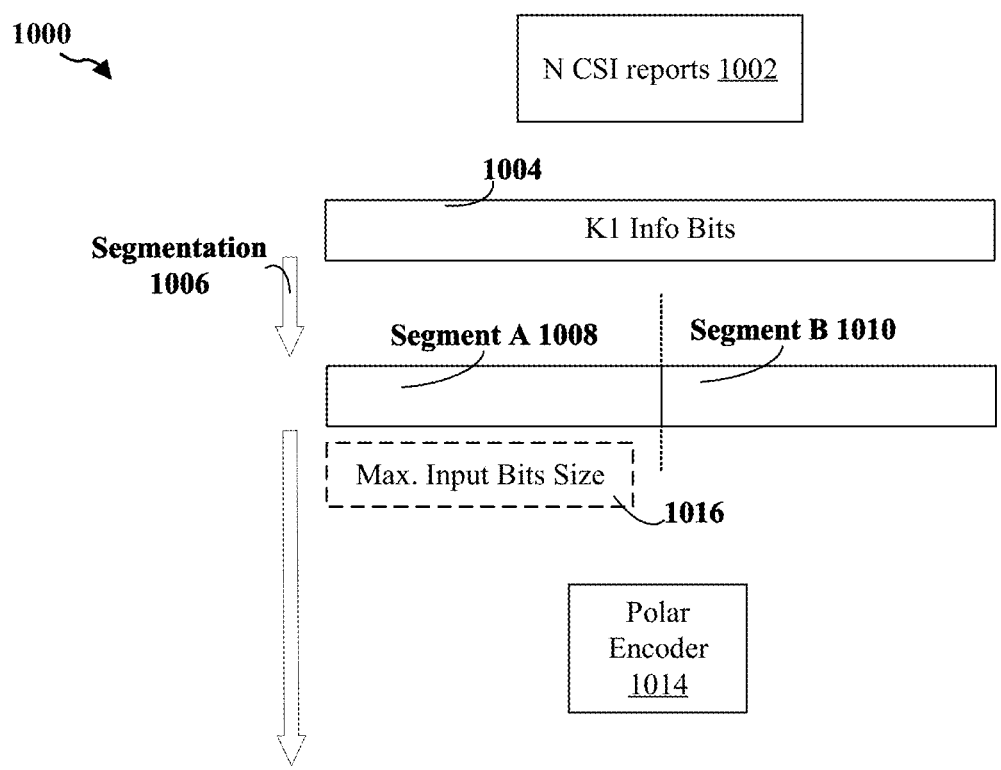
FIGS. 10-11 are diagrams illustrating a technique of reducing UCI payload.
Figure 11:
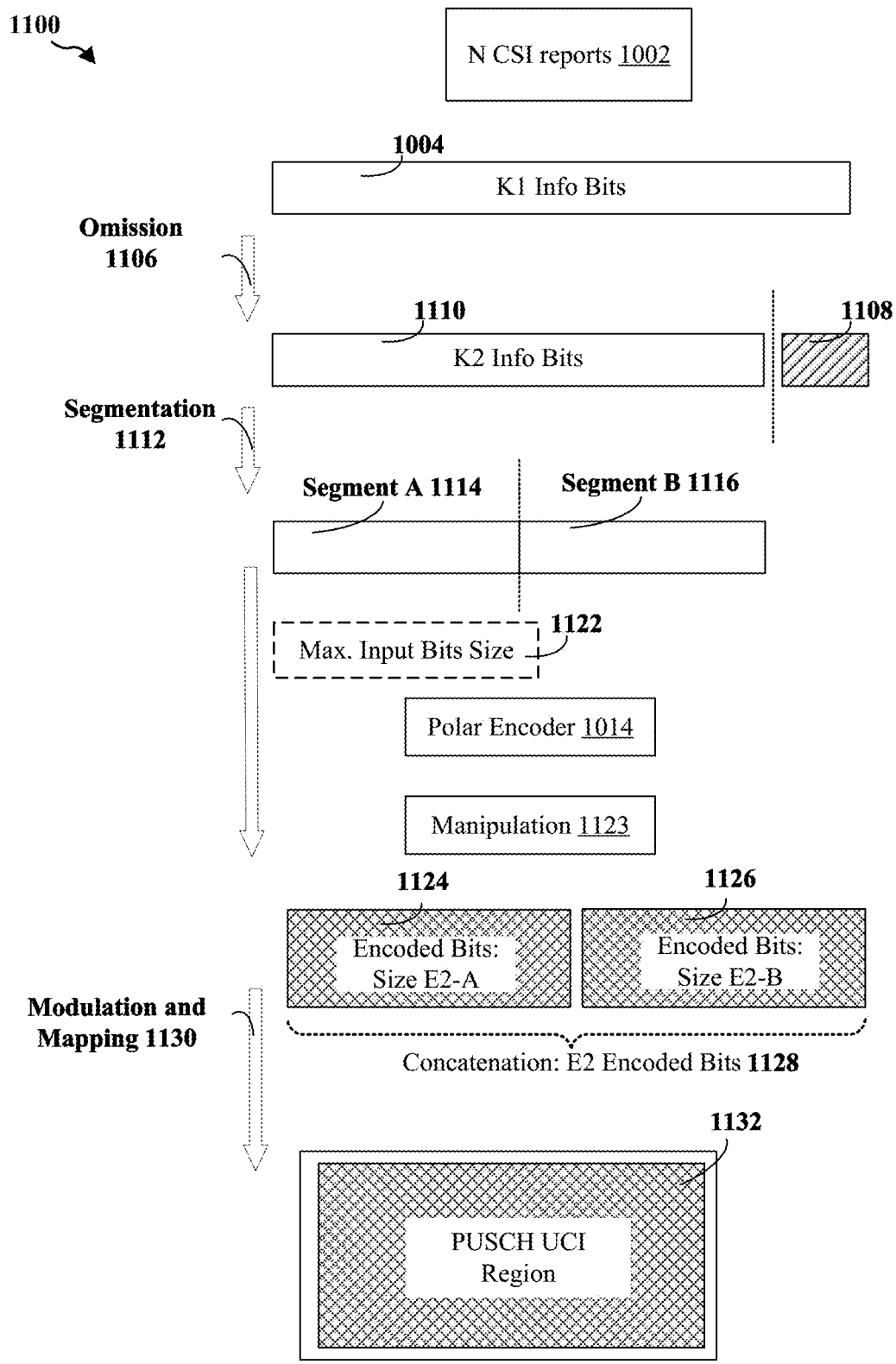

FIG. 10 and FIG. 11 are diagrams 1000 and 1100 illustrating communication between a UE 704 and a base station 702 and a technique of reducing UCI payload. A UE may need to send multiple CSI reports together to a base station. In order to send the multiple CSI reports, the UE initially encodes information bits of the multiple CSI reports. An encoder employed by the UE may only allow a limited number of input bits at once, which may impose a constraint to the size of the information bits of the multiple CSI reports. In response, the UE may apply omissions rules described supra to reduce the size of the information bits such that the reduced size meets the constraint. In this example illustrated in FIG. 10, the UE 704 needs to send N CSI reports 1002 to the base station 702. Information bits 1004 carrying the N CSI reports 1002 have a size K1. In this example, K1 is larger than 3412 bits. The UE 704 may use a segmentation mechanism 1006 to segment the information bits 1004 into maximum M segments. In this example, M is 2. It should be noted that M can be other numbers (e.g., 3), and if it is not necessary for the UE 704 to segment the information bits 1004, M could be 1 (i.e., no segmentation). Ideally, after segmentation, each segment has a size that is no greater than the size of the maximum allowed input bits of the encoder.

As such, the UE can input each segment into the encoder separately and generate encoded bits.

In this example, the UE 704 employs a polar encoder 1014 that has a maximum input size of 1706 bits. Accordingly, the UE 704 segments the information bits 1004 into two segments (which is the maximum allowed number of segments) with equal segment sizes: a segment A 1008 and a segment B 1010. Each of the segment A 1008 and the segment B 1010 has a size larger than the maximum input bits size of the polar encoder 1014. Therefore, the polar encoder 1014 cannot encode all the information bits of the segment A 1008 or of the segment B 1010. Accordingly, the UE may generate an error.

In one technique, upon determining that the size of a segment is still larger than the maximum input size of the polar encoder 1014 under maximum segmentation, the UE 704 may apply the omission rules as illustrated in FIG. 9 to reduce the information bit size of the N CSI reports 1002. More specifically, the UE 704 omits CSI components with the lowest priority (e.g., the CSI components in the Box #2N 924) first and tests whether the constraint has been satisfied (e.g., whether each of M segments has a size no larger than a maximum input bit size of an encoder). If the constraint has not been satisfied, the UE 704 omits CSI components with the lowest priority among remaining CSI components (e.g., the CSI components in the Box #(2N−1) 922) and tests again whether the constraint has been satisfied. This process continues until the constraint has been satisfied eventually.

In this technique, as illustrated in FIG. 11, the UE 704 employs an omission mechanism 1106 to omits a portion 1108 of the K1 information bits 1004 and selects a portion 1110 of the information bits 1004. The omission mechanism 1106 may apply the omission rules describe supra referring to FIG. 9. The selected portion 1110 of the information bits 1004 has a size K2. In this example, K2 is a number such that $$K2/M < K_{polar}.$$

Again, M is the maximum number of segments, and here M is 2; and $K_{polar}$ is the maximum allowable number of input bits of the polar encoder 1014, and here $K_{polar}$ is 1706. Thus, in this example, K2 should be smaller than 3412 bits. The UE 704 employs a segmentation mechanism 1112 to segments the selected portion 1110 of information bits 1004 into two segments with equal segment sizes: a segment A 1114 and a segment B 1116. Each of the segment A 1114 and the segment B 1116 has a size smaller than a maximum input bits size of the encoder used by the UE 704. In this example, each of the segment A 1114 and the segment B 1116 has a size smaller than a maximum input bits size 1122 of the polar encoder 1014, which is 1706 bits. Therefore, the polar encoder 1014 can encode both the segment A 1114 and the segment B 1116 as a result of the operation of omission mechanism 1106.

Subsequently, the UE inputs the segment A 1114 into the polar encoder 1014 to generate corresponding encoded bits. Further, the UE 704 employs a manipulation mechanism 1123 to further manipulate the output encoded bits such that the manipulated bits can be carried in a PUSCH UCI Region 1132 as described infra. For example, the manipulation mechanism 1123 may utilize a circular buffer to perform rate matching, which includes shortening, puncturing, and repetition of the output encoded bits from the polar encoder 1014. The manipulation mechanism 1123 outputs E2-A encoded bits 1124. Similarly, the polar encoder 1014 encodes the segment B 1116, and then the manipulation mechanism 1123 manipulates encoded bits output from the encoder 1014 to obtain E2-B encoded bits 1126. The UE 704 concatenates the E2-A encoded bits 1124 and the E2-B encoded bits 1126 to obtain E2 encoded bits 1128. The UE 704 modulates E2 encoded bits 1128 into modulated symbols and maps the modulated symbols to a PUSCH UCI Region 1132, at the operation of modulation and mapping mechanism 1130.

Figure 12:
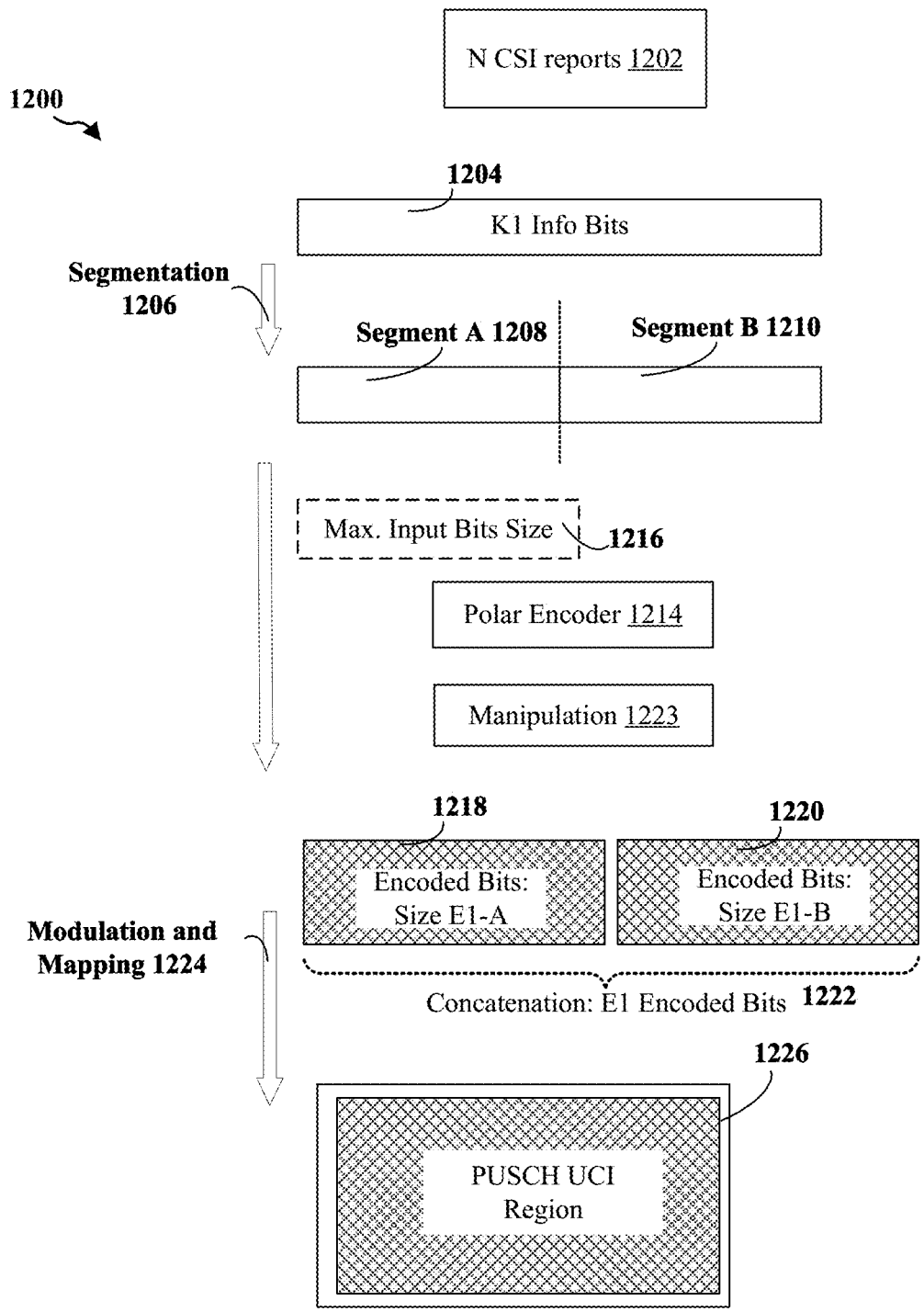
FIGS. 12-13 are diagrams illustrating another technique of reducing UCI payload.
Figure 13:
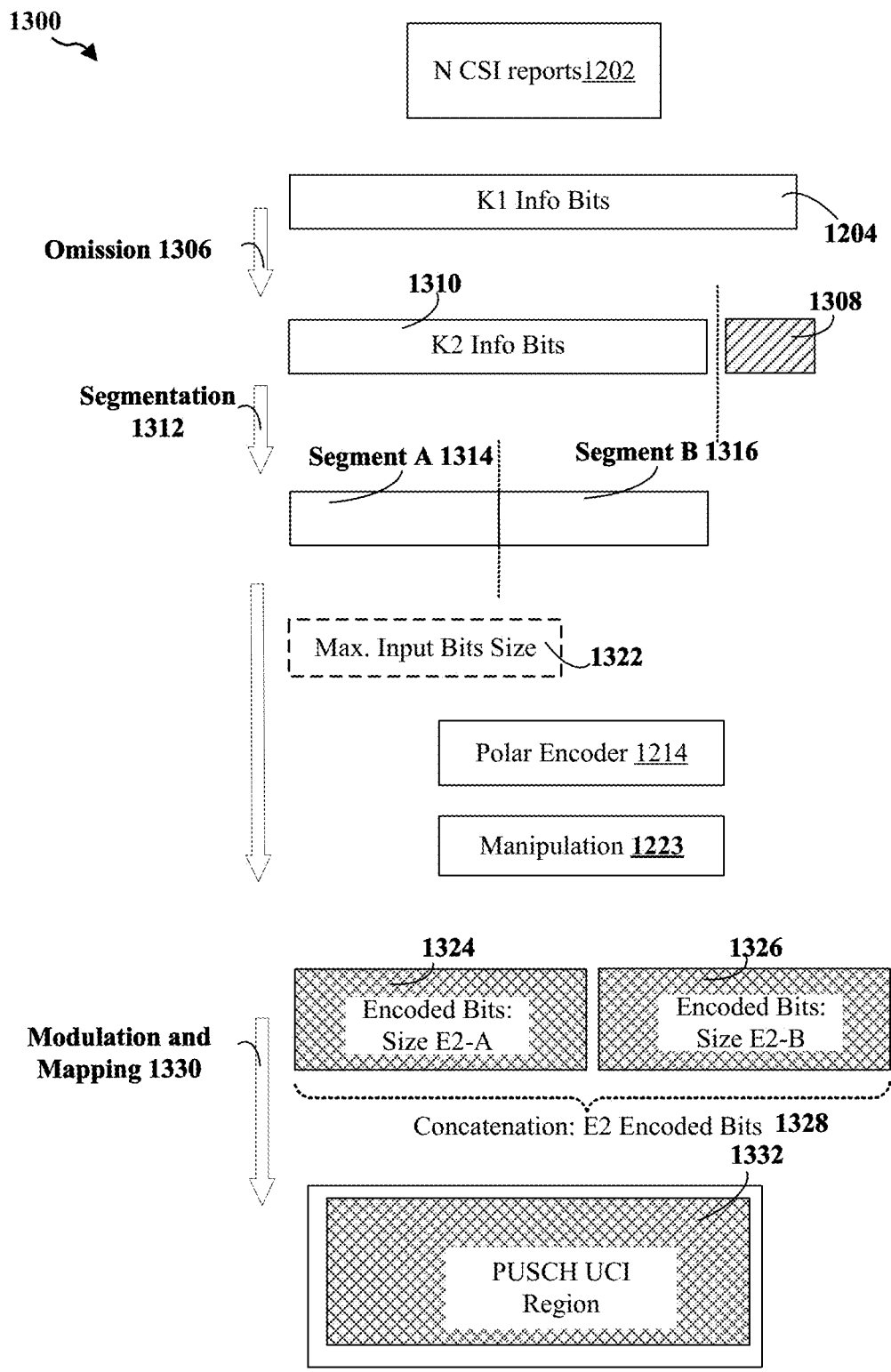

FIG. 12 and FIG. 13 are diagrams 1200 and 1300 illustrating communication between a UE 704 and a base station 702 and another technique of reducing UCI payload. In another technique, when each segment after segmentation is no greater than the maximum input size of an encoder as described supra referring to FIGS. 10-11, the UE may further impose a maximum allowable code rate $CR_{max}$ as a constraint. More specifically, even if each segments of information bits has a size no larger than the maximum input bits number of an encoder, the code rate still cannot exceed the maximum allowable code rate $CR_{max}$. The code rate is the ratio of the number of information bits to the number of encoded bits transmitted in a PUSCH UCI region. If the code rate exceeds $CR_{max}$, the UE may apply omissions rules described supra to reduce the size of the information bits such that the reduced size meets the constraint.

In the example illustrated in FIG. 12, the UE 704 need to send N CSI reports 1202 to the base station 702. Information bits 1204 carrying the N CSI reports 1202 have a size K1. In this example, K1 is smaller than 3412 bits. The UE 704 may use a segmentation mechanism 1206 to segment the information bits 1204 into maximum M segments. In this example, M is 2. It should be noted that M can be other numbers (e.g., 3), and if it is not necessary for the UE 704 to segment the information bits 1204, M could be 1 (i.e., no segmentation).

In this example, the UE 704 segments the information bits 1204 into two segments with equal segment sizes: a segment A 1208 and a segment B 1210. In this example, each of the segment A 1008 and the segment B 1010 has a size smaller than a maximum input bits size 1216 of a polar encoder 1214, which is 1706 bits. Therefore, the polar encoder 1214 can encode each of the segment A 1208 and the segment B 1210.

The polar encoder 1214 encodes the segment A 1208. Further, the UE 704 employs a manipulation mechanism 1223 to further manipulate the output encoded bits such that the manipulated bits can be carried in a PUSCH UCI Region 1226 as described infra. The manipulation mechanism 1223 outputs E1-A encoded bits 1218. Similarly, the polar encoder 1214 encodes the segment B 1210, and then the manipulation mechanism 1223 manipulates encoded bits output from the encoder 1210 to obtain E1-B encoded bits 1222. The UE 704 concatenates the E1-A encoded bits 1218 and the E1-B encoded bits 1220 to obtain E1 encoded bits 1222. The UE 704 modulates E1 encoded bits 1222 into modulated symbols and maps the modulated symbols to a PUSCH UCI region 1226, at the operation of modulation and mapping mechanism 1224. The PUSCH UCI region 1226 can carry the E1 encoded bits.

The UE 704 then calculates a code rate K1/E1 and compares the code rate with a threshold $CR_{max}$. In one technique, when the code rate K1/E1 is greater than $CR_{max}$, the UE 704 may apply omissions rules described supra to reduce the size of the information bits. More specifically, the UE 704 omits CSI components with the lowest priority (e.g., the CSI components in the Box #2N 924) first and tests whether the constraint has been satisfied (e.g., whether the code rate exceeds the maximum allowable code rate for UCI $CR_{max}$). If the constraint has not been satisfied, the UE 704 omits CSI components with the lowest priority among remaining CSI components (e.g., the CSI components in the Box #(2N−1) 922) and tests again whether the constraint has been satisfied. This process continues until the constraint has been satisfied eventually.

In this technique, as illustrated in FIG. 13, the UE 704 employs an omission mechanism 1306 to omits a portion 1308 of the K1 information bits 1204 and selects a portion 1310 of the information bits 1204. The selected portion 1310 of the information bits 1204 has a size K2.

In this example, as described infra, K2 is a number such that $$E2/K2 < CR_{max}.$$

E2 is the number of encoded bits derived from the K2 information bits and to be transmitted in the PUSCH UCI region 1332; $CR_{max}$ is the maximum allowable code rate for UCI. Thus, as a result of the operation of omission mechanism 1306, K2/E2 will be smaller than $CR_{max}$.

The UE 704 may use a segmentation mechanism 1312 to segment the selected portion 1310 of the information bits 1204 into two segments with equal segment sizes: a segment A 1314 and a segment B 1316. Each of the segment A 1314 and the segment B 1316 has a size smaller than a maximum input bits size 1322 of the polar encoder 1214, which is 1706 bits. Therefore, the polar encoder 1214 can encode both the segment A 1314 and the segment B.

The polar encoder 1214 encodes the segment A 1314. Further, the UE 704 employs the manipulation mechanism 1223 to further manipulate the output encoded bits such that the manipulated bits can be carried in a PUSCH UCI Region 1332 as described infra. The manipulation mechanism 1223 outputs E2-A encoded bits 1218. Similarly, the polar encoder 1214 encodes the segment B 1316, and then the manipulation mechanism 1223 manipulates encoded bits output from the encoder 1210 to obtain E2-B encoded bits 1326. The UE 704 concatenates the E2-A encoded bits 1324 and the E2-B encoded bits 1326 to obtain the E2 encoded bits 1328. The UE 704 modulates E2 encoded bits 1328 into modulated symbols and maps the modulated symbols to a PUSCH UCI Region 1332, at the operation of modulation and mapping mechanism 1330. The PUSCH UCI region 1332 can carry the E2 encoded bits.

The UE 704 then calculates a code rate K2/E2 and compares the code rate with a threshold $CR_{max}$. When the code rate K2/E2 is greater than $CR_{max}$, the UE 704 may apply omissions rules described supra to reduce the size of the information bits again until K2/E2 is equal to or smaller than $CR_{max}$.

In another technique, if the information bits needed to be sent is greater than a predefined threshold, low-density parity-check (LDPC) code or encoding path for data channel is used. LDPC is also used for channel coding on the traffic channel, and LDPC corrects channel errors by maintaining parity bits for a selection of the data bits.

In this technique, additional signaling may not be needed to indicate either Polar code or LDPC code is used, because the payload size is known after decoding the Part 1 of the CSI report.

In another technique, given that the maximum number of segmentations M is specified, each segment contains the boxes defined for omission rules in FIG. 9. For example, the first segment contains Box #0 912, Box #1 914, . . . , and Box # k, where k is the largest number such that size of this segment is not greater than a predefined threshold. Then the second segment contains Box #(k+1), . . . , Box # p, where p is the largest number such that size of this segment is not greater than a predefined threshold. This process is continued until M segments are segmented or there are no more remaining boxes (i.e., the Box #2N 924 has been assigned to one of the M segments).

Figure 14:
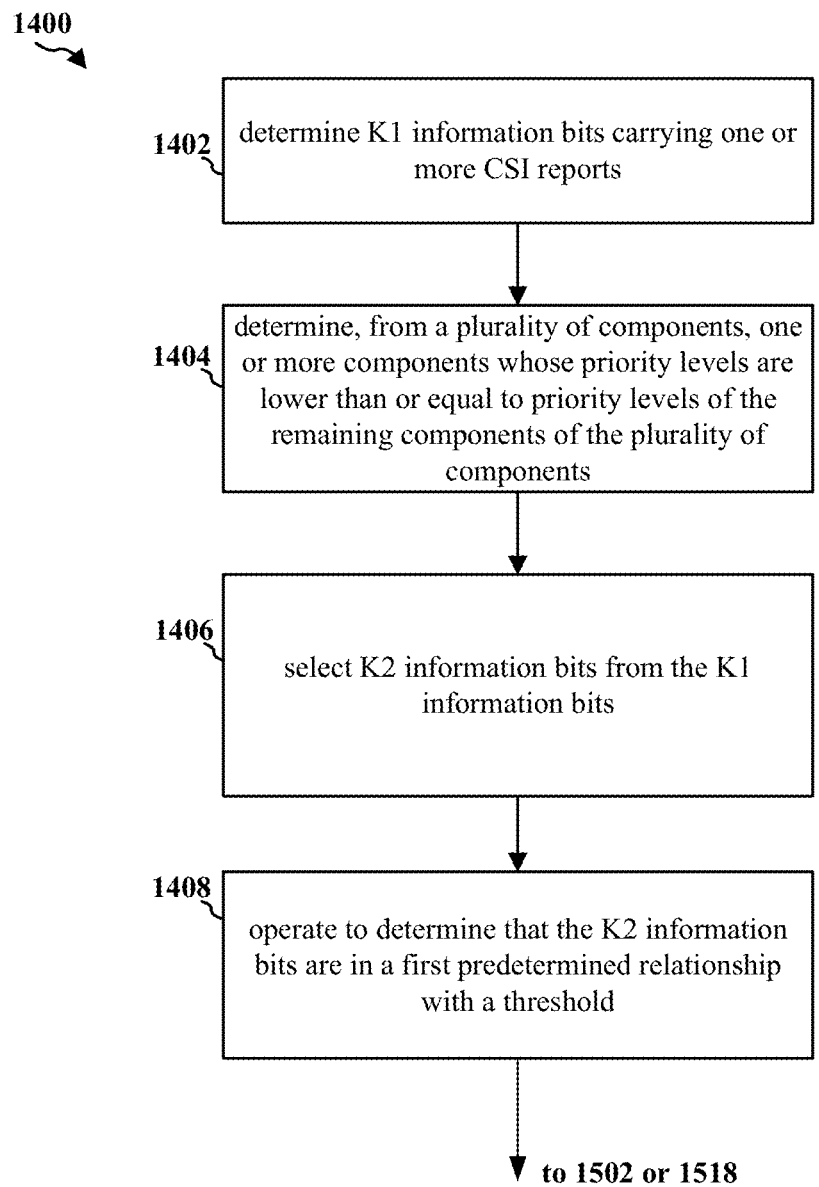
FIG. 14 is a flow chart illustrating a method (process) of reducing UCI payload.

FIG. 14 is a flow chart 1400 illustrating a method (process) of reducing UCI payload. The method may be performed by a UE (e.g., the UE 704, the apparatus 1602/1602'). At operation 1402, the UE 704 determines K1 information bits (e.g., the K1 information bits 1004/1204) carrying one or more CSI reports (e.g., the N CSI reports 1002). The one or more reports including a first CSI report (e.g., the CSI report N 810-N), and K1 (e.g., 4000) is an integer greater than 0. The first CSI report includes a first part (e.g., the Part 1 813-N) and a second part (e.g., the Part 2 814 of the CSI report N 810-N). The second part contains a plurality of components corresponding to one or more priority levels (e.g., the priority 910).

At operation 1404, the UE 704 determines, from the plurality of components, one or more components whose priority levels are lower than or equal to priority levels of the remaining components of the plurality of components.

At operation 1406, the UE 704 selects K2 information bits (e.g., the K2 information bits 1110/1310) from the K1 information bits. The K2 information bits exclude a part of information bits of the first CSI report. K2 (e.g., 3000) is an integer greater than 0 and smaller than K1. In some configurations, the part of information bits excluded (e.g., the omitted portion 1108/1308) carries a first component of the second part. In some configurations, the one or more components include the first component, and the part of the information bits excluded carries the one or more components. In some configurations, the remaining components of the plurality of components are a maximum number of components that allow the first code rate (e.g., K2/E2) to be smaller than the code-rate threshold (e.g., $CR_{max}$).

At operation 1408, the UE 704 operates to determine that the K2 information bits are in a first predetermined relationship with a threshold. Operation 1408 is followed by operation 1502 or 1518 in FIG. 15.

Figure 15:
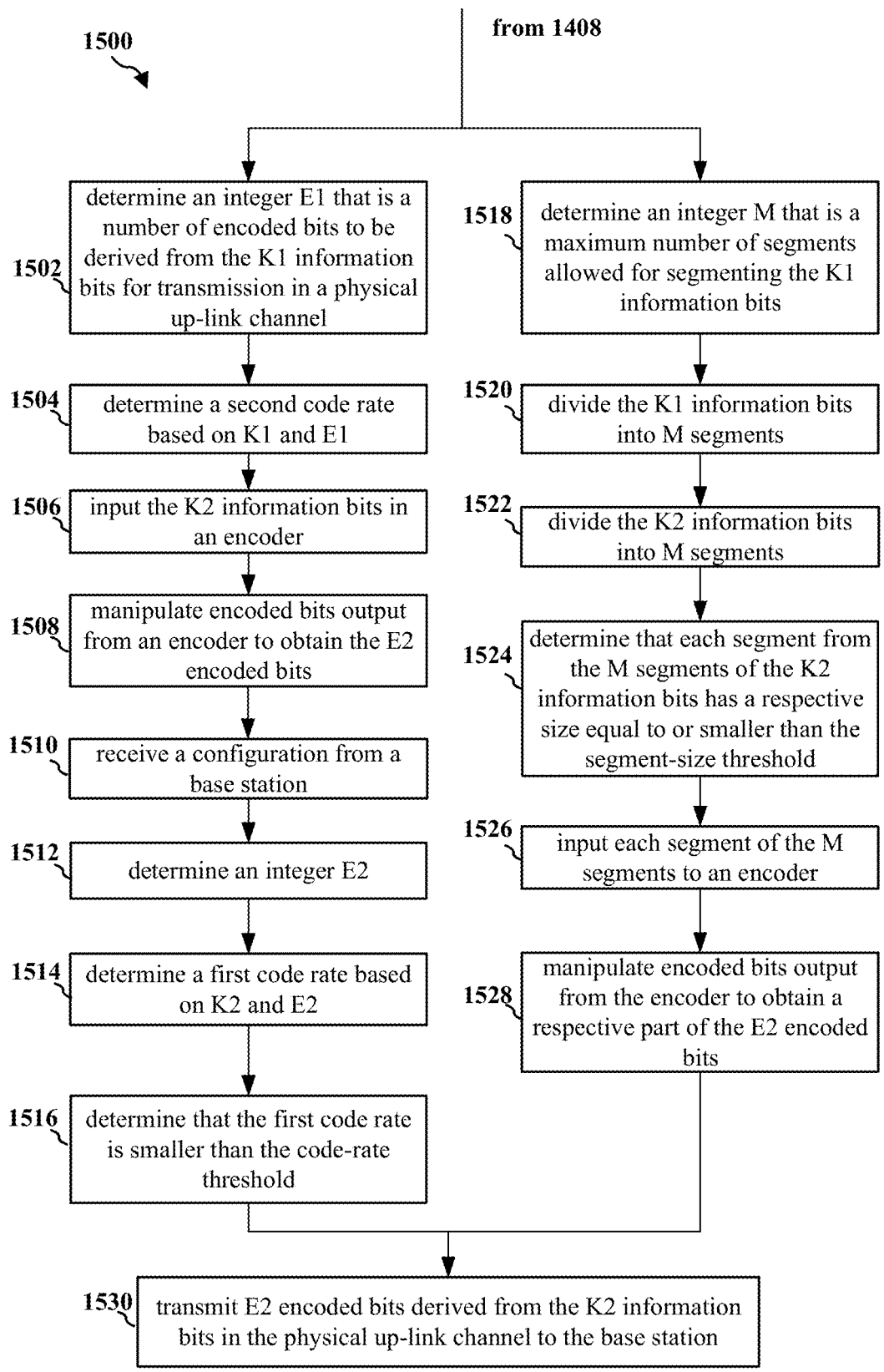
FIG. 15 is a flow chart illustrating another method (process) of reducing UCI payload.

FIG. 15 is a flow chart 1500 illustrating a method (process) of reducing UCI payload. The method may be performed by a UE (e.g., the UE 704, the apparatus 1602/1602').

Alternatively, the threshold is a code-rate threshold (e.g., $CR_{max}$). At operation 1502, the UE 704 determines an integer E1 that is a number of encoded bits (e.g., the E1 encoded bits 1022) to be derived from the K1 information bits for transmission in a physical up-link channel (e.g., the PUSCH UCI region 1026).

At operation 1504, the UE 704 determines a second code rate (e.g., K1/E1) based on K1 and E1. The K2 information bits are selected in response to determining that the second code rate (e.g., K1/E1) is in equal to or greater than the code-rate threshold.

At operation 1506, the UE 704 inputs the K2 information bits in an encoder (e.g., the polar encoder 1014/1214).

At operation 1508, the UE 704 manipulates encoded bits output from the encoder to obtain the E2 encoded bits (e.g., the E2 encoded bits 1128/1328).

At operation 1510, the UE 704 receives a configuration from the base station (e.g., the base station 702). The configuration indicates at least one of the code-rate threshold and the integer E2.

At operation 1512, the UE 704 determines the integer E2.

At operation 1514, the UE 704 determines a first code (e.g., K2/E2) rate based on K2 and E2.

At operation 1516, the UE 704 determines that the first code rate is smaller than the code-rate threshold (e.g., $CR_{max}$).

Alternatively, the threshold is a segment-size threshold (e.g., 1706 bits). At operation 1518, the UE 704 determines an integer M (e.g., 2) that is a maximum number of segments allowed for segmenting the K1 information bits (e.g., the K1 information bits 1004).

At the operation 1520, the UE 704 divides the K1 information bits (the K1 information bits 1004) into M segments (the segment A 1008 and the segment B 1010). The K2 information bits (the K2 information bits 1110) are selected in response to determining that at least one segment from the M segments of the K1 information bits has a size greater than the segment-size threshold (e.g., 1706 bits).

At operation 1522, the UE 704 divides the K2 information bits (e.g., the K2 information bits) into M segments (e.g., the segment A 1114 and the segment B 1116).

At operation 1524, the UE 704 determines that each segment from the M segments of the K2 information bits has a respective size equal to or smaller than the segment-size threshold (e.g., 1706 bits).

At the operation 1526, the UE 704 inputs each segment of the M segments to an encoder (e.g., the polar encoder 1014).

At the operation 1528, the UE 704 manipulates encoded bits output from the encoder to obtain a respective part of the E2 encoded bits (e.g., the encoded bits 1124 and the encoded bits 1126).

At operation 1530, the UE 704 transmits E2 encoded bits derived from the K2 information bits in the physical up-link channel (e.g., the PUSCH UCI region 1132/1332) to the base station (e.g., the base station 702).

Figure 16:
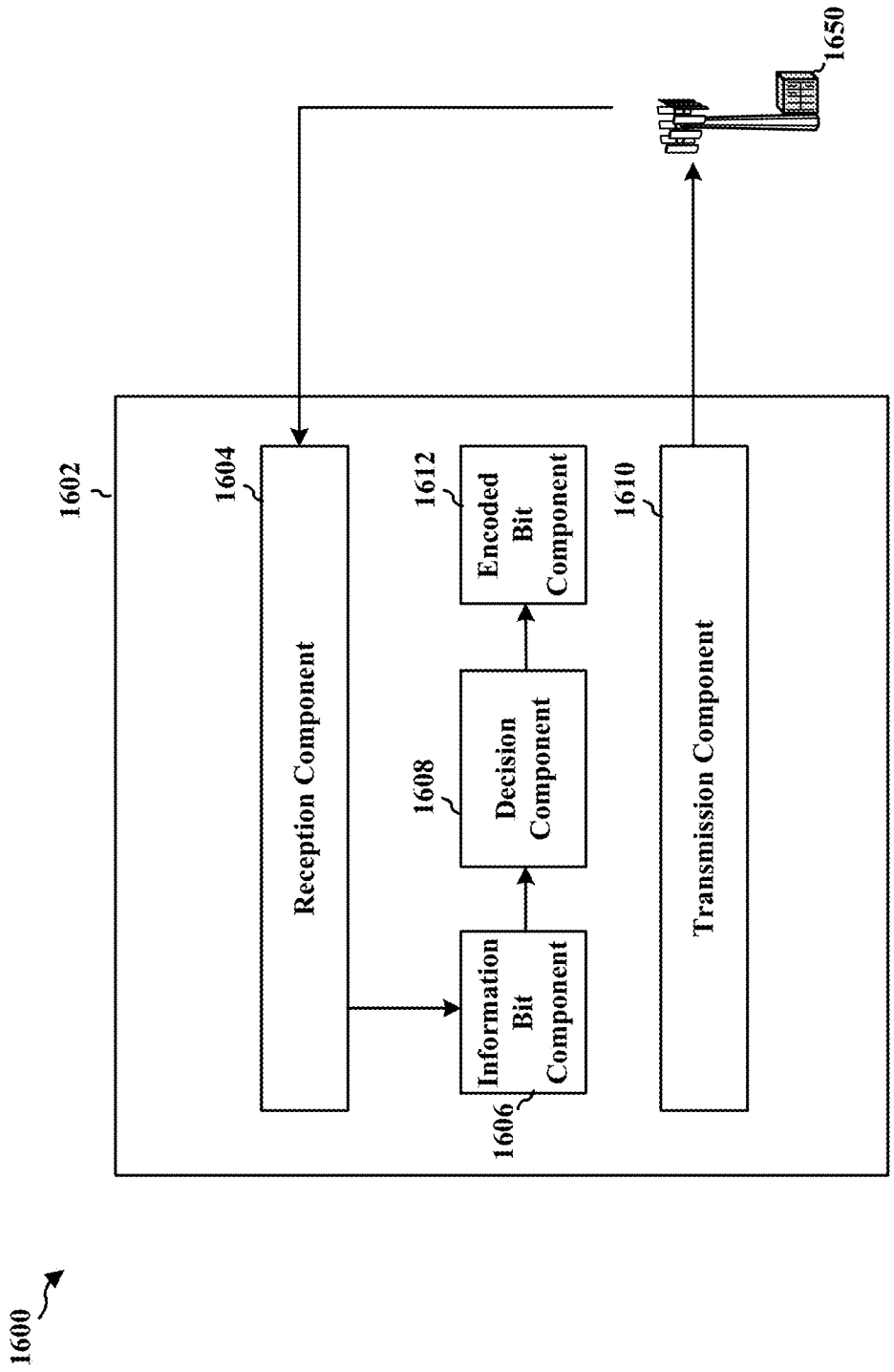
FIG. 16 is a conceptual data flow diagram illustrating the data flow between different components/means in an exemplary apparatus.

FIG. 16 is a conceptual data flow diagram 1600 illustrating the data flow between different components/means in an exemplary apparatus 1602. The apparatus 1602 may be a UE. The apparatus 1602 includes a reception component 1604, an information bit component 1606, a decision component 1608, an encoded bit component 1616, and a transmission component 1610.

The decision component 1608 determines K1 information bits (e.g., the K1 information bits 1004/1204) carrying one or more CSI reports (e.g., the N CSI reports 1002). The one or more reports including a first CSI report (e.g., the CSI report N 810-N), and K1 (e.g., 4000) is an integer greater than 0. The first CSI report includes a first part (e.g., the Part 1 813-N) and a second part (e.g., the Part 2 814 of the CSI report N 810-N). The second part contains a plurality of components corresponding to one or more priority levels (e.g., the priority 910).

The decision component 1608 determines, from the plurality of components, one or more components whose priority levels are lower than or equal to priority levels of the remaining components of the plurality of components.

The information bit component 1606 selects K2 information (e.g., the K2 information bits 1110/1310) bits from the K1 information bits. The K2 information bits exclude a part of information bits of the first CSI report. K2 (e.g., 3000) is an integer greater than 0 and smaller than K1. In some configurations, the part of information bits excluded (e.g., the omitted portion 1108/1308) carries a first component of the second part. In some configurations, the one or more components include the first component, and the part of the information bits excluded carries the one or more components. In some configurations, the remaining components of the plurality of components are a maximum number of components that allow the first code rate (e.g., K2/E2) to be smaller than the code-rate threshold (e.g., $CR_{max}$).

The decision component 1608 operates to determine that the K2 information bits are in a first predetermined relationship with a threshold.

Alternatively, the threshold is a code-rate threshold (e.g., $CR_{max}$). The decision component 1608 determines an integer E1 that is a number of encoded bits (e.g., the E1 encoded bits 1022) to be derived from the K1 information bits for transmission in a physical up-link channel (e.g., the PUSCH UCI region 1026).

The decision component 1608 determines a second code rate (e.g., K1/E1) based on K1 and E1. The K2 information bits are selected in response to determining that the second code rate (e.g., K1/E1) is in equal to or greater than the code-rate threshold.

The information bit component 1606 inputs the K2 information bits in an encoder (e.g., the polar encoder 1014/1214).

The encoded bit component 1612 manipulates encoded bits output from the encoder to obtain the E2 encoded bits (e.g., the E2 encoded bits 1128/1328).

The reception component 1604 receives a configuration from the base station (e.g., the base station 702). The configuration indicates at least one of the code-rate threshold and the integer E2.

The decision component 1608 determines the integer E2.

The decision component 1608 determines a first code (e.g., K2/E2) rate based on K2 and E2.

The decision component 1608 determines that the first code rate is smaller than the code-rate threshold (e.g., $CR_{max}$).

Alternatively, the threshold is a segment-size threshold (e.g., 1706 bits). The decision component 1608 determines an integer M (e.g., 2) that is a maximum number of segments allowed for segmenting the K1 information bits (e.g., the K1 information bits 1004).

The information bit component 1606 divides the K1 information bits (the K1 information bits 1004) into M segments (the segment A 1008 and the segment B 1010). The K2 information bits (the K2 information bits 1110) are selected in response to determining that at least one segment from the M segments of the K1 information bits has a size greater than the segment-size threshold (e.g., 1706 bits).

The information bit component 1606 divides the K2 information bits (e.g., the K2 information bits) into M segments (e.g., the segment A 1114 and the segment B 1116).

The decision component 1608 determines that each segment from the M segments of the K2 information bits has a respective size equal to or smaller than the segment-size threshold (e.g., 1706 bits).

The information bit component 1606 inputs each segment of the M segments to an encoder (e.g., the polar encoder 1014).

The encoded bit component 1612 manipulates encoded bits output from the encoder to obtain a respective part of the E2 encoded bits (e.g., the encoded bits 1124 and the encoded bits 1126).

The transmission component 1610 transmits E2 encoded bits derived from the K2 information bits in the physical up-link channel (e.g., the PUSCH UCI region 1132/1332) to the base station (e.g., the base station 702).

Figure 17:
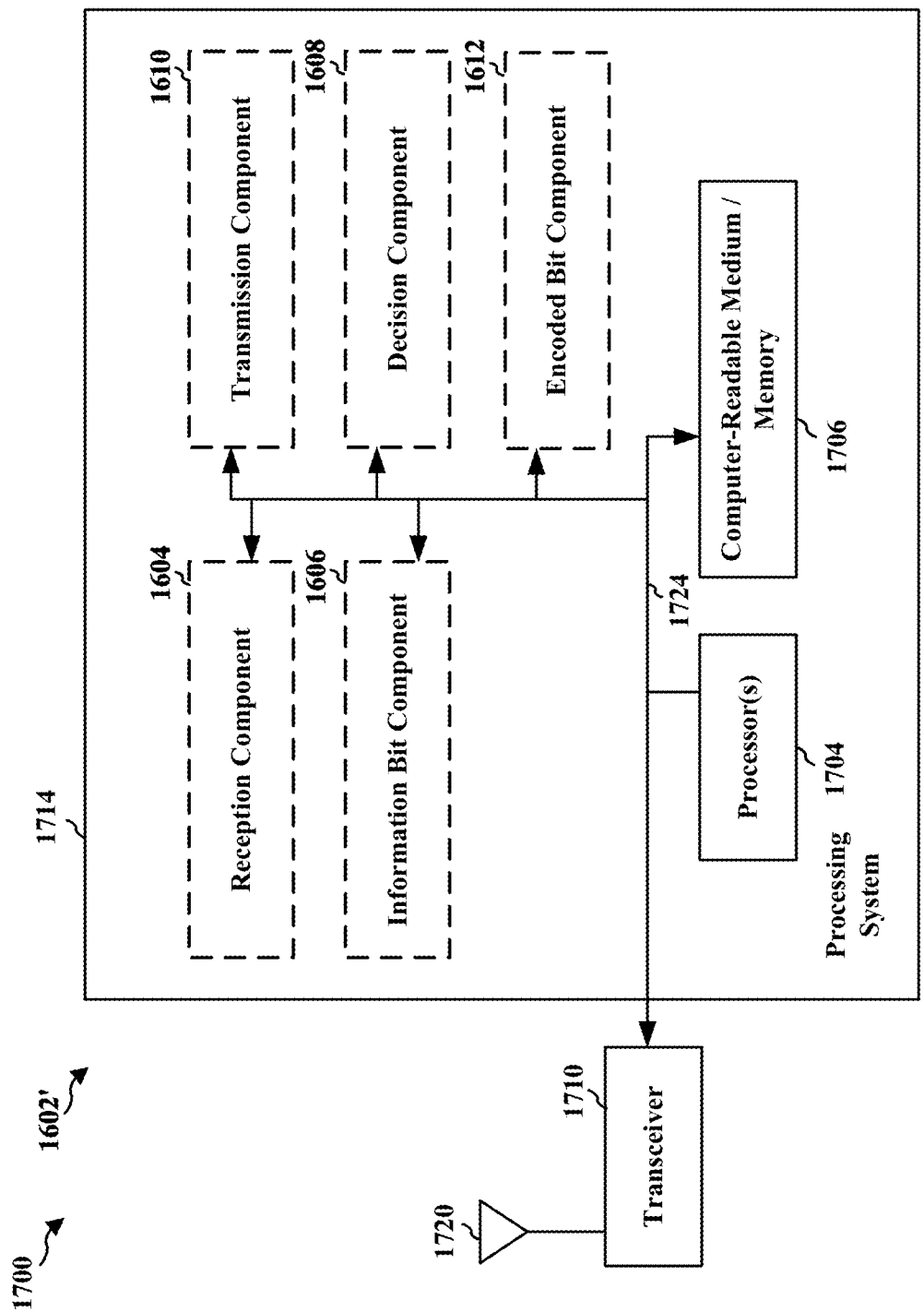
FIG. 17 is a diagram illustrating an example of a hardware implementation for an apparatus employing a processing system.

FIG. 17 is a diagram 1700 illustrating an example of a hardware implementation for an apparatus 1602' employing a processing system 1314. The apparatus 1202' may be a UE. The processing system 1714 may be implemented with a bus architecture, represented generally by a bus 1724. The bus 1724 may include any number of interconnecting buses and bridges depending on the specific application of the processing system 1714 and the overall design constraints. The bus 1724 links together various circuits including one or more processors and/or hardware components, represented by one or more processors 1704, the reception component 1604, the information bit component 1606, the decision component 1608, the transmission component 1610, the encoded bit component 1612, and a computer-readable medium/memory 1706. The bus 1724 may also link various other circuits such as timing sources, peripherals, voltage regulators, and power management circuits, etc.

The processing system 1714 may be coupled to a transceiver 1710, which may be one or more of the transceivers 254. The transceiver 1710 is coupled to one or more antennas 1720, which may be the communication antennas 252.

The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1610, and based on the received information, generates a signal to be applied to the one or more antennas 1720.

The processing system 1714 includes one or more processors 1704 coupled to a computer-readable medium/memory 1706. The one or more processors 1704 are responsible for general processing, including the execution of software stored on the computer-readable medium/memory 1706. The software, when executed by the one or more processors 1704, causes the processing system 1714 to perform the various functions described supra for any particular apparatus. The computer-readable medium/memory 1706 may also be used for storing data that is manipulated by the one or more processors 1704 when executing software. The processing system 1714 further includes at least one of the reception component 1604, the information bit component 1606, the decision component 1608, the transmission component 1610, and the encoded bit component 1612. The components may be software components running in the one or more processors 1704, resident/stored in the computer readable medium/memory 1706, one or more hardware components coupled to the one or more processors 1704, or some combination thereof. The processing system 1714 may be a component of the UE 250 and may include the memory 260 and/or at least one of the TX processor 268, the RX processor 256, and the communication processor 259.

In one configuration, the apparatus 1602/apparatus 1602' for wireless communication includes means for performing each of the operations of FIG. 14 and FIG. 15. The aforementioned means may be one or more of the aforementioned components of the apparatus 1602 and/or the processing system 1714 of the apparatus 1602' configured to perform the functions recited by the aforementioned means.

As described supra, the processing system 1714 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining K1 information bits carrying one or more channel state information (CSI) reports, the one or more reports including a first CSI report, K1 being an integer greater than 0;
   selecting K2 information bits from the K1 information bits, the K2 information bits excluding a part of information bits of the first CSI report, K2 being an integer greater than 0 and smaller than K1;
   determining E2 encoded bits derived from the K2 information bits to be transmitted, E2 being an integer greater than 0;
   determining a first code rate based on K2 and E2;
   determining that the first code rate is smaller than a code-rate threshold; and
   transmitting the E2 encoded bits in a physical up-link channel to a base station.

2. The method of claim 1, further comprising:
   receiving a configuration from the base station, the configuration indicates at least one of the code-rate threshold and the integer E2.

3. The method of claim 1, further comprising:
inputting the K2 information bits in an encoder; and
manipulating encoded bits output from the encoder to obtain the E2 encoded bits.

4. The method of claim 1, further comprising:
determining E1 encoded bits to be derived from the K1 information bits for transmission in the physical up-link channel, E1 being an integer; and
determining a second code rate based on K1 and E1, wherein the K2 information bits is selected in response to determining that the second code rate is in equal to or greater than the code-rate threshold.

5. The method of claim 1, wherein the first CSI report includes a first part and a second part, wherein the part of information bits excluded carries a first component of the second part.

6. The method of claim 5, wherein the second part contains a plurality of components corresponding to one or more priority levels, the method further comprising:
determining, from the plurality of components, one or more components whose priority levels are lower than or equal to priority levels of the remaining components of the plurality of components, wherein the one or more components include the first component, wherein the part of the information bits excluded carries the one or more components.

7. The method of claim 6, wherein the remaining components of the plurality of components are a maximum number of components that allow the first code rate to be smaller than the code-rate threshold.

8. A method of wireless communication of a user equipment (UE), comprising:
determining K1 information bits carrying one or more channel state information (CSI) reports, the one or more reports including a first CSI report, K1 being an integer greater than 0;
selecting K2 information bits from the K1 information bits, the K2 information bits excluding a part of information bits of the first CSI report, K2 being an integer greater than 0 and smaller than K1;
determining an integer M that is a maximum number of segments allowed for segmenting the K1 information bits; and
dividing the K2 information bits into M segments;
determining that each segment from the M segments of the K2 information bits has a respective size equal to or smaller than a segment-size threshold; and
transmitting E2 encoded bits derived from the K2 information bits in a physical up-link channel to a base station, E2 being an integer greater than 0.

9. The method of claim 8, further comprising:
dividing the K1 information bits into M segments, wherein the K2 information bits are selected in response to determining that at least one segment from the M segments of the K1 information bits has a size greater than the segment-size threshold.

10. The method of claim 8, further comprising:
inputting each segment of the M segments to an encoder; and
manipulating encoded bits output from the encoder to obtain a respective part of the E2 encoded bits.

11. The method of claim 8, wherein the first CSI report includes a first part and a second part, wherein the part of information bits excluded carries a first component of the second part.

12. The method of claim 11, wherein the second part contains a plurality of components corresponding to one or more priority levels, the method further comprising:
determining, from the plurality of components, one or more components whose priority levels are not greater than priority levels of the remaining components of the plurality of components, wherein the one or more components include the first component, wherein the part of the information bits excluded carries the one or more components.

13. An apparatus for wireless communication, the apparatus being a user equipment (UE), comprising:
a memory; and
at least one processor coupled to the memory and configured to:
determine K1 information bits carrying one or more channel state information (CSI) reports, the one or more reports including a first CSI report, K1 being an integer greater than 0;
select K2 information bits from the K1 information bits, the K2 information bits excluding a part of information bits of the first CSI report, K2 being an integer greater than 0 and smaller than K1;
determine E2 encoded bits derived from the K2 information bits to be transmitted, E2 being an integer greater than 0;
determine a first code rate based on K2 and E2;
determine that the K2 information bits are in a first predetermined relationship with a threshold; and
determine that the first code rate is smaller than a code-rate threshold; and
transmit the E2 encoded bits derived from the K2 information bits in a physical up-link channel to a base station, E2 being an integer greater than 0.

14. The apparatus of claim 13, wherein the at least one processor is further configured to:
input the K2 information bits in an encoder; and
manipulate encoded bits output from the encoder to obtain the E2 encoded bits.

15. The apparatus of claim 13, wherein the at least one processor is further configured to:
determine an integer E1 that is a number of encoded bits to be derived from the K1 information bits for transmission in the physical up-link channel; and
determine a second code rate based on K1 and E1, wherein the K2 information bits is selected in response to determining that the second code rate is in equal to or greater than the code-rate threshold.

16. An apparatus for wireless communication, the apparatus being a user equipment (UE), comprising:
a memory; and
at least one processor coupled to the memory and configured to:
determine K1 information bits carrying one or more channel state information (CSI) reports, the one or more reports including a first CSI report, K1 being an integer greater than 0;
select K2 information bits from the K1 information bits, the K2 information bits excluding a part of information bits of the first CSI report, K2 being an integer greater than 0 and smaller than K1;
determine an integer M that is a maximum number of segments allowed for segmenting the K1 information bits; and
divide the K2 information bits into M segments;

determine that each segment from the M segments of the K2 information bits has a respective size equal to or smaller than a segment-size threshold; and transmit E2 encoded bits derived from the K2 information bits in a physical up-link channel to a base station, E2 being an integer greater than 0.

17. The apparatus of claim 16, wherein the at least one processor is further configured to:

divide the K1 information bits into M segments, wherein the K2 information bits are selected in response to determining that at least one segment from the M segments of the K1 information bits has a size greater than the segment-size threshold.

\* \* \* \* \*